March 10, 1925.
O. A. HANFORD
1,529,540
METHOD AND APPARATUS FOR BLOWING GLASS
Filed March 7, 1921
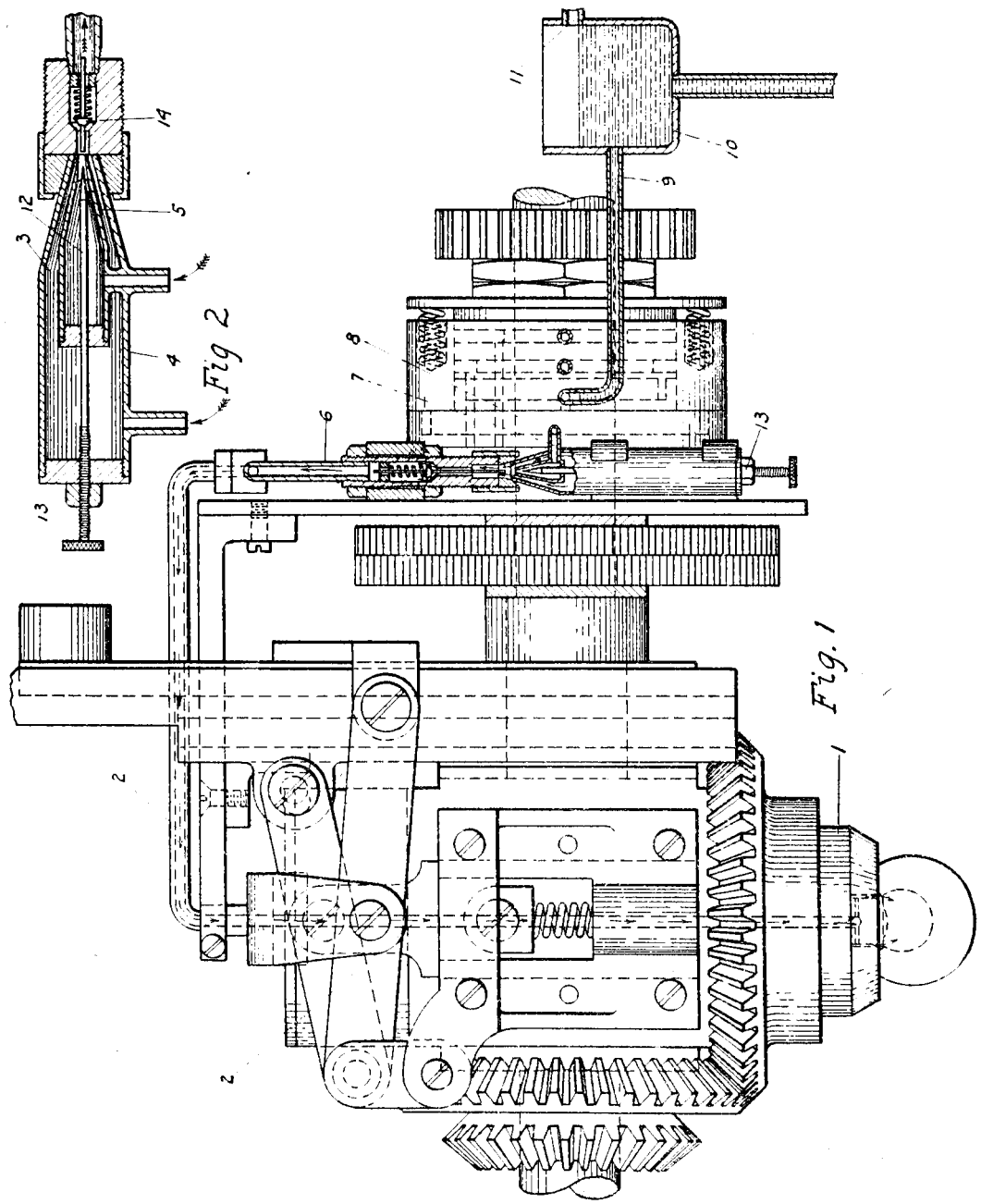
Orin A. Hanford INVENTOR.
BY
Edwin P. Corrett ATTORNEY.

Patented Mar. 10, 1925.

1,529,540

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO

METHOD AND APPARATUS FOR BLOWING GLASS.

Application filed March 7, 1921. Serial No. 450,383.

*To all whom it may concern:*

Be it known that I, ORIN A. HANFORD, a citizen of the United States of America, residing at Columbus, in the county of Franklin and State of Ohio, have invented certain new and useful Improvements in Methods and Apparatus for Blowing Glass, of which the following is a specification.

My invention relates to method and apparatus for blowing glass and has particular relation to the introduction of air into partially formed blanks of glass during the stages leading to and including the final formation of the articles to be produced. It is particularly suitable in connection with the production of blown glassware of the finer type, such as blown tumblers, electric light bulbs, et cetera.

The progress of the art has inevitably trended more and more toward the production of glassware by machinery rather than manually and, at the present time, the blowing of glassware by machinery is rapidly encroaching upon the field of the skilled hand-worker. But experience and observation have convinced me that the use of compressed air in blowing by machinery is subject to serious defects of operation and I have observed that these defects are more pronounced and accentuated on some days than on others. For instance, I have observed that compressed air as ordinarily used has a very undesirable limitation as to expansiveness, in other words, that it is likely to "go dead" before it has accomplished the purpose for which it has been introduced into the article, as for instance in the elongation of the blanks preparatory to final blowing. Furthermore, I have noticed that the degree of expansiveness of the compressed air varies with the humidity of the atmosphere, which imparts an unreliability extremely detrimental to the successful manufacture of the finer grades of ware. Finally, I have observed that these defects do not seem to exist in the manual production of blown glassware.

From a placing of these various facts side-by-side and an analytical consideration of such facts and other facts related thereto, I have come to a full appreciation of the fact that air as normally used in blowing by machinery has a very vital fault. This fault consists primarily in the fact that the air expands too quickly for the proper handling of the glass in the process of formation. Viscous glass is very sensitive but is far more responsive to pressure gradually and continuously applied than it is to pressure more suddenly applied. This is true whether it is being used in the introduction of "puffs" of air or whether it is being used in the prolonged admission of air into a blank.

As a result of my study of this problem, I have devised a method of and apparatus for treating the air to be used in the expansion of the blanks both in the introduction of "puffs" of air and in the prolonged admission of air into the blanks. The treatment is such that when the air enters the blank and is subjected to the intense heat therein it will expand more slowly and to a greater extent and it will continue to expand for a greater length of time than it would if it were not for the treatment. This is particularly important in the introduction of the "puffs" of air during and prior to the step of elongation. Observation of the hand method will disclose that the "puffs" of air introduced are more effective because of inherent expansiveness after introduction than because of the pressure under which they are introduced.

In preferred form my invention contemplates the addition of moisture to the air on its way to the blanks. The moisture is in the form of a vapor and is from a water-supply of such a nature that the water is supplied continuously but not under pressure.

Preferably, the air is laden with moisture by means of an inspirator, the air passing by a nozzle containing water and drawing moisture with it. Regulating means is provided for permitting adjustable determination of the amount of moisture picked up by the air. The moisture is vaporized but is so fine that there is no danger of blowing out of the blank.

The preferred embodiment of my invention is shown in the accompanying drawings wherein similar characters of reference designate corresponding parts and wherein—

Figure 1 is a partially diagrammatic representation of a single unit of my machine with moisture supplying device applied thereto.

Figure 2 is a detail view of the inspirator removed.

In the drawings, the blank holding head is shown at 1 as comprising a number of parts which hardly require detailed description for the purpose of making clear the present invention. Leading through this head and to the interior of any blank supported thereon is an air passage 2.

The air passage is a continuation of the air passage 3 in an inspirator 4 having a concentrically disposed nozzle 5. The air passage 3 is supplied with air under pressure in any desired manner, preferably continuously. The inspirator 4 is movable into and out of fitting relation to a pipe 6 in which starts the air passage 2. It may be maintained in this fitting relation for long or short intervals, depending upon the character of air introduction desired.

The nozzle 5 of the inspirator is preferably connected by a pipe 7, an annular channel 8 and a pipe 9 with a water tank that is exemplified diagrammatically as at 10 and has an overflow opening at 11. The head of water maintained in the tank 10 is just sufficient to maintain a volume of water in the nozzle 5 that will permit the air passing along passage 3 by such nozzle to draw with it a moderate amount of moisture.

The nozzle 5 is provided with a needle valve 12. By adjusting this needle valve, the amount of moisture with which the air is ultimately laden may be regulated at will. A means 13 is provided for maintaining this needle valve in any position to which it is adjusted, also a check valve 14 is contained in the pipe 6 for retaining the air within the blank after it has once been introduced.

From this structure it will be obvious that the air being introduced into the blanks may be laden with vaporized moisture to any desired degree. The moisture laden air will enter the blank with the moisture in the form of fine vapor which will retard the heating of the air and consequently slow down and protract expansion of this air. The important ultimate result of this is that the pressure thus applied to the blank will be relatively gradual and prolonged which is much better suited to the forming of viscous glass than quick and violent pressure.

This is a highly important development in the art. It will prevent the air from "going dead" after brief expansion with consequent tendency of the partially blown blank to collapse, as in the process of elongation. It is within the bounds of my invention to substitute other mixtures of fluids than compressed air and water. For instance, certain chemicals may conceivably be used to slow down expansion or to increase the volume to which the fluid will expand.

Having thus described my invention, what I claim is:

1. In the blowing of glassware, the method of automatically introducing into the blank a fluid that will expand more slowly than compressed air.

2. In the blowing of glassware, the method of automatically introducing into the blank a fluid that will have a slower and more protracted expansion than compressed air.

3. In the blowing of glassware, the method of automatically introducing into the blank a fluid that will expand to a greater extent than compressed air.

4. In the blowing of glassware, the method of automatically introducing into the blank a fluid that will expand more slowly and to a greater extent than compressed air.

5. In the art of glass working, the method of introducing air into glass blanks which comprises treating the air to make it expand more gradually.

6. In the blowing of glassware, the method which comprises introducing compressed air into the blanks and supplying moisture to said compressed air on its way to the blank.

7. In the blowing of glassware, the method which comprises passing air in such relation to a liquid that it will pick up a vapor therefrom, and introducing the vaporized air into a blank.

8. In the blowing of glassware, the method which comprises automatically supplying vaporized moisture not under pressure to air, and introducing the air so impregnated into a blank.

9. The method of elongating a blank for blown ware which comprises automatically introducing a puff of moisture impregnated air into said blank.

10. Apparatus for delivering air to the interior of a glass blank comprising means for impregnating the air with moisture.

11. Apparatus for delivering air to the interior of a glass blank comprising means for passing air through a conduit, means for introducing moisture not under pressure into the air.

12. Apparatus for delivering air to the interior of a glass blank comprising means for conducting water to a point where it will be picked up as a vapor by the air on its way to the blank interior.

13. Apparatus for delivering air to the interior of a glass blank comprising an inspirator supplied with water and means for passing the air through said inspirator on its way to the blank whereby it draws moisture with it.

14. Apparatus for delivering air to the interior of a glass blank comprising means for supplying moisture to the air, and means for regulating the amount of moisture supplied.

15. In the blowing of glassware, the method of retaining the blank on a holder, passing air through a conduit leading to said holder and impregnating such air with moisture.

16. In the blowing of glassware, the method of retaining the blank on a holder, passing air through a conduit leading to said holder and impregnating such air with moisture as it passes through said conduit.

17. In the blowing of glassware, the method of retaining a blank on a holder, passing air through a conduit, impregnating such air with moisture and then delivering such moisture impregnated air to said blank.

18. In the blowing of glassware, the method of impregnating continuously flowing air with moisture and introducing a portion of such moisture impregnated air into a blank.

19. In the blowing of glassware, the method of retaining a blank on a holder, passing air through a conduit, impregnating such air with moisture and intermittently delivering moisture impregnated air to said blank.

20. The method of blowing glassware which consists in conducting air through a conduit, conducting liquid to a point where it will be picked up by the air passing through said conduit and then introducing such moisture impregnated air to the blank.

21. The method of blowing glassware which consists in passing air through a conduit, impregnating such air with moisture, and intermittently introducing such moisture impregnated air to a blank.

22. Glass blowing apparatus comprising a holder for the blank, means for delivering air to said blank and means for impregnating such air with moisture.

23. Glass blowing apparatus comprising means for intermittently delivering air to the interior of a glass blank and means for impregnating continuously flowing air with moisture.

24. Glass blowing apparatus comprising means for passing air through a conduit, means for supplying moisture to the air, means for regulating the amount of moisture supplied and means for intermittently introducing the moisture impregnated air to the blank.

25. Glass blowing apparatus comprising means for impregnating air with moisture, means for introducing such moisture impregnated air to the interior of a glass blank under pressure and means for automatically retaining such air in the blank.

26. Glass blowing apparatus comprising a fluid conducting conduit, a liquid conducting conduit, means for conducting the liquid to a point where it will be picked up by the fluid and means for intermittently introducing such moisture impregnated fluid into a glass blank.

27. Glass blowing apparatus comprising a fluid conducting conduit, a liquid conducting conduit, means for continuously conducting the liquid to a point where it will be picked up by the fluid and means for intermittently introducing such moisture impregnated fluid into a glass blank.

28. Glass blowing apparatus comprising a fluid conducting conduit, a liquid conducting conduit, means for conducting the liquid to a point where it will be picked up by the fluid, means for intermittently introducing such moisture impregnated fluid into a glass blank and means for retaining said fluid in said blank.

29. Glass blowing apparatus comprising a fluid conducting conduit, a liquid conducting conduit, means for continuously conducting the liquid to a point where it will be picked up by the fluid, means for intermittently introducing such moisture impregnated fluid into a glass blank and means for retaining said fluid in said blank.

30. Glass blowing apparatus comprising a fluid conducting conduit, a liquid conducting conduit, means for continuously passing fluid through said conduit, means for conducting the liquid to a point where it will be picked up as a vapor by the fluid and means for intermittently introducing such moisture impregnated fluid into the glass blank.

31. Glass blowing apparatus comprising a fluid conducting conduit, a liquid conducting conduit, means for continuously passing fluid through said conduit, means for conducting the liquid to a point where it will be picked up as a vapor by the fluid, means for intermittently introducing such moisture impregnated fluid into the glass blank and means for retaining said fluid in said blank.

32. Glass blowing apparatus comprising an air conducting conduit, a liquid conducting conduit, means for combining such air and such liquid and means for actuating said first named means to effect the introduction of such moisture impregnated air into the interior of a glass blank.

33. Glass blowing apparatus comprising an air conducting conduit, a liquid conducting conduit, means for combining such air and such liquid and means for actuating said first named means to intermittently effect the introduction of such moisture impregnated air into the interior of a glass blank.

In testimony whereof I hereby affix my signature.

ORIN A. HANFORD